United States Patent
Maniktala (10) Patent No.: US 10,903,693 B2
(45) Date of Patent: Jan. 26, 2021

(54) MULTIPLE INTERLEAVED COIL STRUCTURES FOR WIRELESS POWER TRANSFER

(71) Applicant: ChargEdge, Inc., Fremont, CA (US)

(72) Inventor: Sanjaya Maniktala, Fremont, CA (US)

(73) Assignee: CHARGEDGE, INC., Fremont, CA (US)

(*) Notice: Subject to any disclaimer, the term of this patent is extended or adjusted under 35 U.S.C. 154(b) by 0 days.

(21) Appl. No.: 16/384,555

(22) Filed: Apr. 15, 2019

(65) Prior Publication Data

US 2019/0312463 A1  Oct. 10, 2019

Related U.S. Application Data (63) Continuation of application No. 15/082,672, filed on Mar. 28, 2016, now Pat. No. 10,263,471.

(60) Provisional application No. 62/143,033, filed on Apr. 4, 2015, provisional application No. 62/139,785, filed on Mar. 29, 2015.

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02J 50/40* | (2016.01) |

(52) U.S. Cl.
CPC .............. *H02J 50/12* (2016.02); *H02J 50/40* (2016.02)

(58) Field of Classification Search
CPC . H02J 5/005; H02J 7/025; H02J 17/00; H01F 38/14; B60L 11/182

USPC ......................................................... 307/104
See application file for complete search history.

(56) References Cited

U.S. PATENT DOCUMENTS 6,212,430 B1     4/2001  Kung
7,629,859 B2 *  12/2009  Rai ...................... H03B 5/1847
                                                    331/117 R (Continued)

FOREIGN PATENT DOCUMENTS

WO     WO-2013122483 A1     8/2013

OTHER PUBLICATIONS

Maniktala, S. "The Confluence of Resonant Switching Topologies and Wireless Charging," presented at ISSCC 2015, San Francisco, CA, Feb. 26, 2015.

(Continued)

*Primary Examiner* — Anh Q Tra
(74) *Attorney, Agent, or Firm* — White & Case LLP (57) ABSTRACT

In one embodiment, a multiple interleaved coil structure for wireless power transfer includes a plurality of incomplete coils, each of the plurality of incomplete coils configured such that an alternating current flowing in the incomplete coil produces a magnetic field, and at least one interconnect between the plurality of incomplete coils, the at least one interconnect including a plurality of conductors arranged in such a way that the alternating current flowing in the plurality of conductors does not produce a magnetic field. Each of the plurality of incomplete coils includes a plurality of non-contiguous segments arranged in such a way that the incomplete coil will emit magnetic flux in response to an applied alternating current. The multiple interleaved coil structure can be implemented in a wireless power transmitter or a wireless power receiver.

28 Claims, 7 Drawing Sheets

(56) References Cited

U.S. PATENT DOCUMENTS

| | | | |
|---|---|---|---|
| 8,183,971 B2* | 5/2012 | Le Guillou | H01F 17/0006 336/200 |
| 8,422,973 B2* | 4/2013 | Takarada | H01Q 7/00 340/572.1 |
| 8,860,521 B2* | 10/2014 | Ahmed | H01F 29/00 331/181 |
| 9,276,437 B2 | 3/2016 | Partovi et al. | |
| 9,723,121 B2* | 8/2017 | Lam | H04M 1/72527 |
| 10,529,795 B2* | 1/2020 | Liu | H01F 17/0006 |
| 2004/0056738 A1* | 3/2004 | Aiga | H01P 1/20381 333/204 |
| 2008/0231408 A1* | 9/2008 | Wang | H01F 27/2804 336/212 |
| 2008/0238600 A1* | 10/2008 | Olson | H01F 17/0006 336/180 |
| 2009/0096413 A1 | 4/2009 | Partovi et al. | |
| 2010/0259217 A1 | 10/2010 | Baarman et al. | |
| 2012/0248883 A1* | 10/2012 | Konanur | H01F 21/12 307/104 |
| 2013/0093252 A1 | 4/2013 | Norconk et al. | |
| 2014/0070622 A1 | 3/2014 | Keeling et al. | |
| 2014/0232330 A1 | 8/2014 | Robertson et al. | |
| 2015/0295416 A1 | 10/2015 | Li | |
| 2016/0284465 A1* | 9/2016 | Maniktala | H01F 38/14 |
| 2016/0285317 A1* | 9/2016 | Maniktala | H02J 50/12 |

OTHER PUBLICATIONS

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.aps?doc_id=1272231.

Maniktala, S., "WPT Breaks All Connections, Part 1," EDN Network, Mar. 9, 2015, http://www.edn.com/design/power-management/4438850/WPT-breaks-all-connections-Part-1.

Maniktala, S., "WPT Breaks All Connections, Part 2," EDN Network, Mar. 14, 2015, http://www.edn.com/design/power-management/4438924/WPT-breaks-all-connections-Part-2.

Maniktala, S., "WPT Breaks All Connections, Part 3," EDN Network, Apr. 6, 2015, http://www.edn.com/design/power-management/4439125/WPT-breaks-all-connections-Part-3.

"Notification of Transmittal of the International Search Report and the Written Opinion of the International Searching Authority," Int'l Appl. No. PCT/US2016/024483, dated Jun. 20, 2016.

Power Matters Alliance, "PMA Inductive Wireless Power and Charging Receiver Specification—System Release 1," PMA-TS-0001-0 v1.00, Nov. 16, 2013.

Power Matters Alliance, "PMA Inductive Wireless Power and Charging Transmitter Specification—System Release 1," PMA-TS-0003-0 v2.00, Apr. 24, 2014.

Wireless Power Consortium, "Qi System Description Wireless Power Transfer," vol. I: Low Power, Part 1: Interface Definition, Version 1-1.2, Jun. 2013.

* cited by examiner

FIG. 8

MULTIPLE INTERLEAVED COIL STRUCTURES FOR WIRELESS POWER TRANSFER

CROSS-REFERENCE TO RELATED APPLICATIONS

This application is a continuation of U.S. application Ser. No. 15/082,672, filed on Mar. 28, 2016 (now allowed) and claims the benefit of and incorporates by reference in their entirety U.S. Provisional Patent Application No. 62/143,033, entitled "Interleaved and Distributed Coil Structures," filed on Apr. 4, 2015 and U.S. Provisional Patent Application No. 62/139,785, entitled "Wireless Power Transfer Method Using Multiple Coil Arrays," filed on Mar. 29, 2015. The specifications of each of the foregoing applications are incorporated herein by reference in their entirety.

FIELD OF THE INVENTION

The invention relates generally to wireless power transfer and more particularly to interleaved and distributed coil structures for wireless power transfer.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) systems typically use time-varying magnetic fields and the principle of magnetic induction or magnetic resonant induction to transfer power wirelessly. In accordance with Faraday's Law, a time-varying current applied to a transmitter coil produces a magnetic field that will induce a voltage in a receiver coil that is in close proximity to the transmitter coil. The induced voltage in the receiver coil is typically rectified and filtered to produce a substantially direct current (DC) voltage that can provide power to an electronic device or a rechargeable battery. Such wireless power transfer systems may use magnetic induction or magnetic resonant induction techniques, both of which emit magnetic flux in the "near-field." Such near-field techniques are capable of transferring power only when the transmitter coil and the receiver coil are within a short distance from one another, typically on the order of a few centimeters or less.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Figure 1:
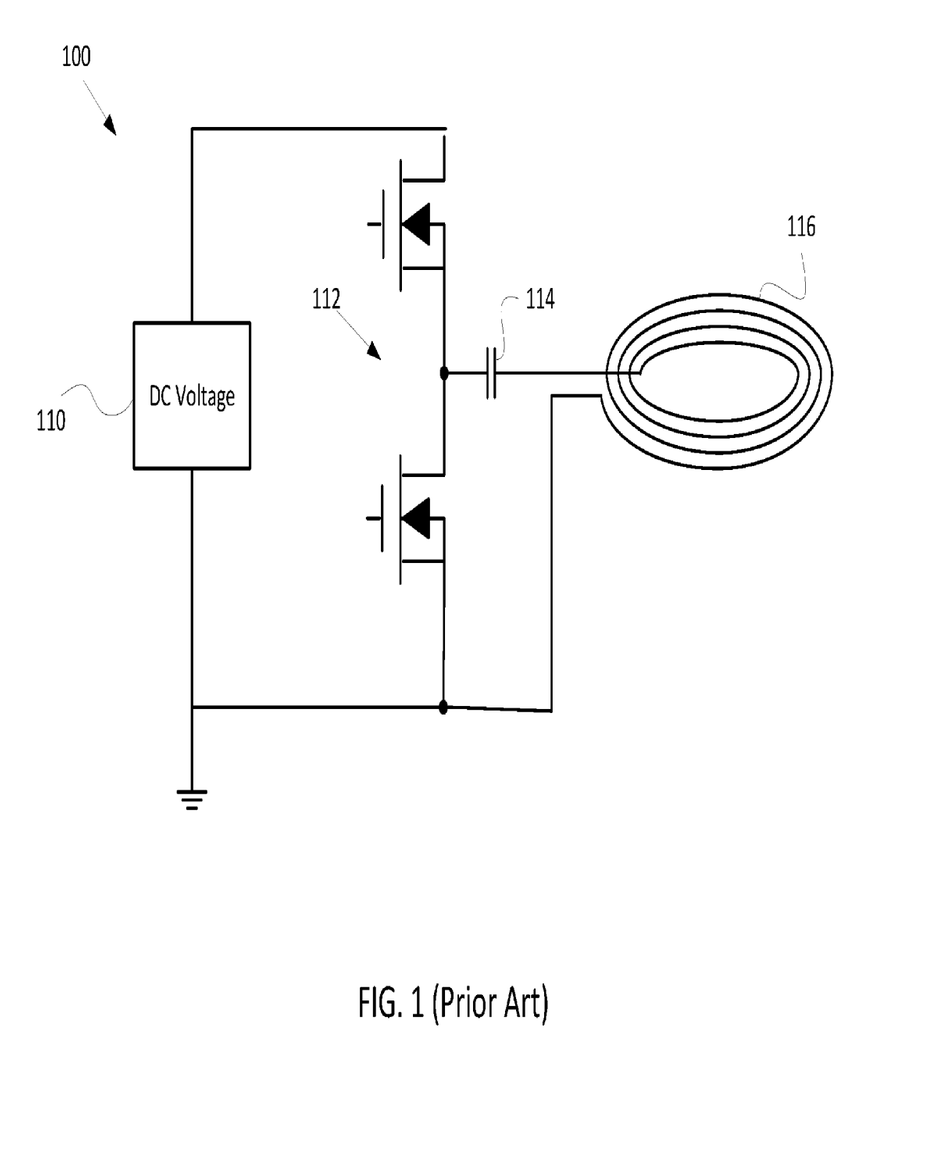
FIG. 1 is a diagram of a prior art embodiment of wireless power transmitter with a single coil.

FIG. 1 is a diagram of a prior art embodiment of a single coil structure for wireless power transfer. A transmitter 100 includes a DC voltage source 110, a half-bridge inverter circuit 112, a resonant capacitor 114, and a coil 116. Coil 116 is typically a flat spiral coil with a predetermined number of turns. Half-bridge inverter circuit 112 is controlled by a control circuit (not shown) to provide an alternating current to capacitor 114 and coil 116. The current is typically in the range of 100 KHz to 400 kHz. The capacitance value of capacitor 114 and the inductance value of coil 116 determine a resonant frequency for transmitter 100. The alternating current passing through coil 116 generates magnetic flux that can induce a current in a receiver coil (not shown).

One drawback of single coil wireless power transmitters is that the area of the transmitter coil is limited by the magnetic field necessary to induce a sufficiently large current in a receiver coil. This limitation results from the fact that the magnetic flux produced by a coil is inversely proportional to its area. A small coil in the power transmitter makes its alignment with the receiver coil in the device to be charged more critical. But merely enlarging the area of a spiral coil will cause the magnetic flux generated by the coil to be weaker, particularly in the middle of the coil. One option for overcoming this limitation is to use multiple coils instead of a single coil. A multiple of identical coils can cover a greater area while each coil can generate a sufficient magnetic flux for effective power transfer.

Figure 2:
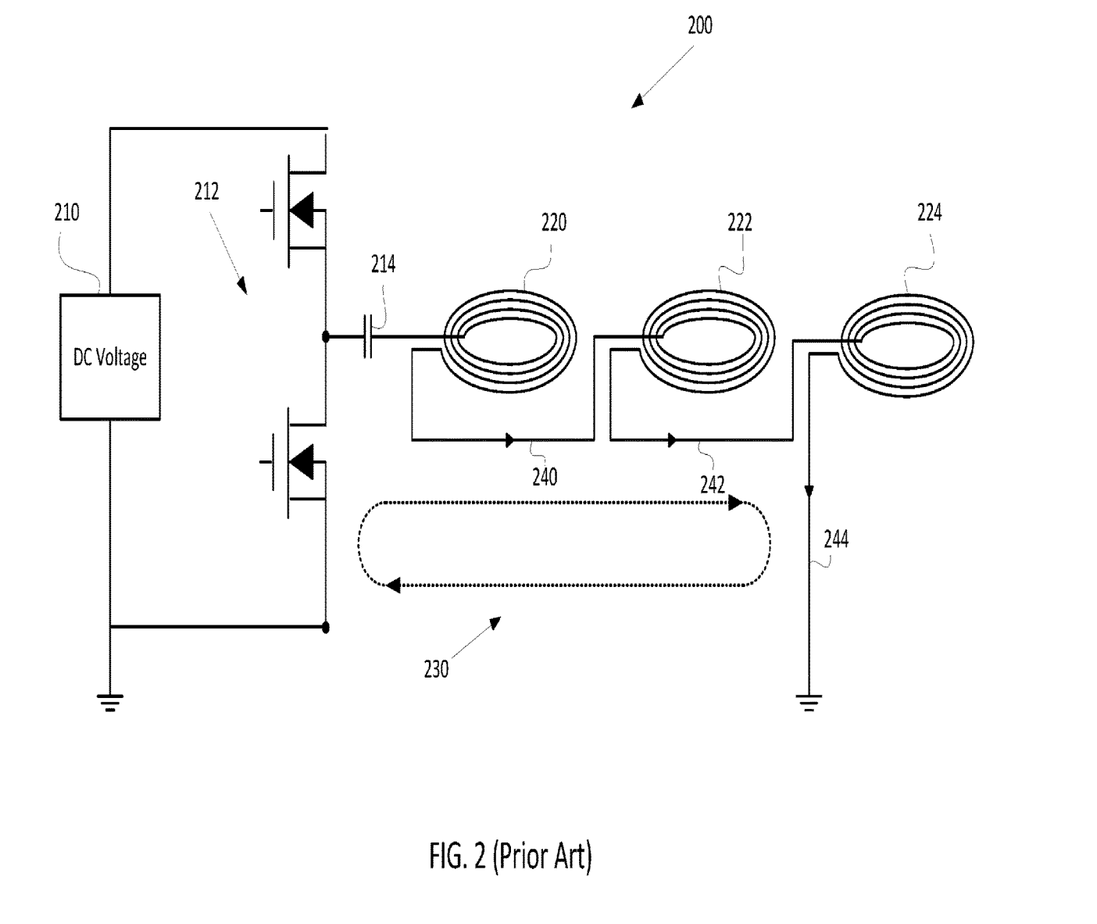
FIG. 2 is a diagram of a prior art embodiment of a wireless power transmitter with multiple coils.

FIG. 2 is a diagram of a prior art embodiment of a multiple coil structure for wireless power transfer. A transmitter 200 includes a DC voltage source 210, a half-bridge inverter circuit 212, a capacitor 214, and multiple coils 220, 222, and 224 connected in series. Coils 220, 222, and 224 collectively provide a larger area that emits magnetic flux. But the multiple coil arrangement in FIG. 2 has a drawback. Connections 240 and 242 between coils 220, 222, and 224 and connection 244 between coil 224 and ground create an unintended loop 230 of parasitic inductance. Loop 230 can become an inadvertent emitter of unwanted electromagnetic interference (EMI). Thus there is a need for a technique for increasing the transmitting area of a wireless power transmitter that does not introduce unwanted EMI.

SUMMARY

In one embodiment, a multiple interleaved coil structure for wireless power transfer includes a plurality of incomplete coils, each of the plurality of incomplete coils configured such that an alternating current flowing in the incomplete coil produces a magnetic field, and at least one interconnect between the plurality of incomplete coils, the at least one interconnect including a plurality of conductors arranged in such a way that the alternating current flowing in the plurality of conductors does not produce a magnetic field. Each of the plurality of incomplete coils includes a plurality of non-contiguous segments arranged in such a way that the incomplete coil will emit magnetic flux in response to an applied alternating current. The multiple interleaved coil structure can be implemented in a wireless power transmitter or a wireless power receiver.

In one embodiment, a multiple interleaved coil structure for wireless power transfer includes a plurality of coils, each of the plurality of coils formed from non-contiguous segments of a conductor, and at least one interconnect configured to couple a first one of the plurality of coils to a second one of the plurality of coils, the at least one interconnect including a plurality of segments of the conductor arranged in such a way that an alternating current flowing in the at least one interconnect does not produce a magnetic field. Each of the plurality of coils includes a plurality of non-contiguous segments arranged in such a way that the coil will emit magnetic flux in response to an applied alternating current. The multiple interleaved coil structure can be implemented in a wireless power transmitter or a wireless power receiver.

In one embodiment, a multiple interleaved coil structure for wireless power transfer includes a plurality of coil arrays, each of the plurality of coil arrays including a plurality of incomplete coils, each of the plurality of incomplete coils configured such that an alternating current flowing in the incomplete coil produces a magnetic field, and at least one interconnect between the plurality of incomplete coils, the at least one interconnect including a plurality of conductors arranged in such a way that the alternating current flowing in the plurality of conductors does not produce a magnetic field, wherein the plurality of coil arrays are coupled together in series.

DETAILED DESCRIPTION

Figure 3:
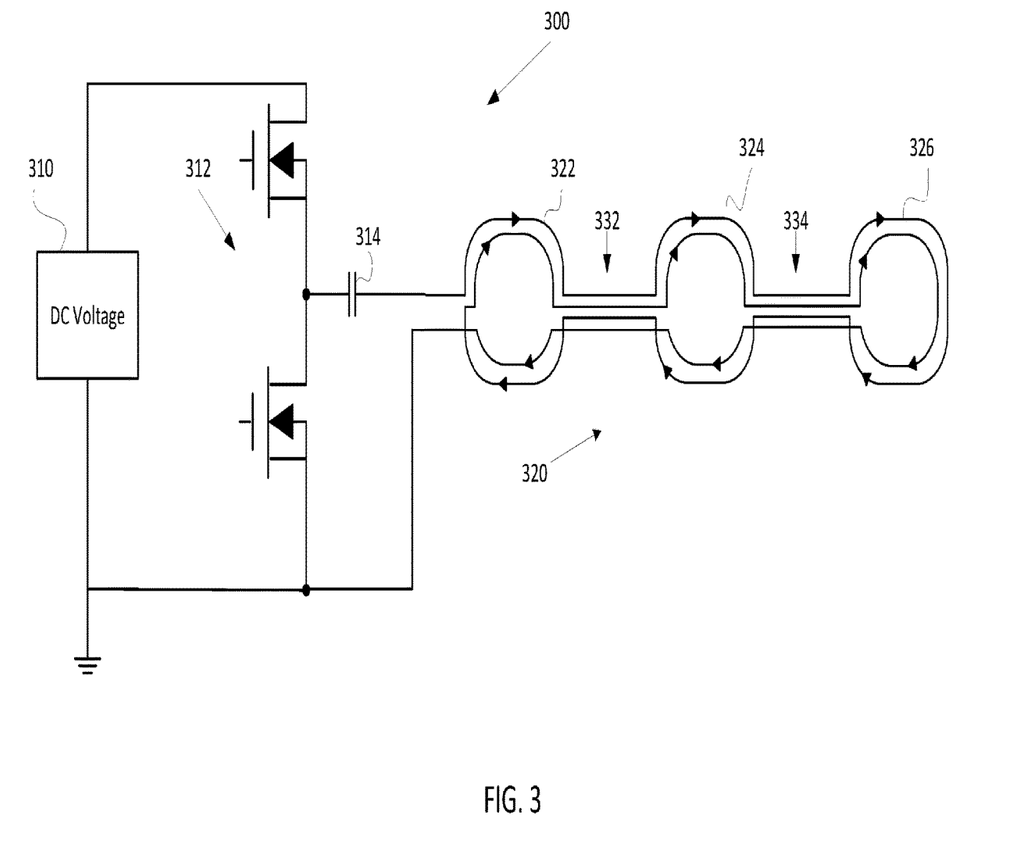
FIG. 3 is a diagram of a wireless power transmitter with a multiple interleaved coil structure, according to one embodiment of the invention.

FIG. 3 is a diagram of a wireless power transmitter 300 with a multiple coil structure, according to one embodiment of the invention. Transmitter 300 includes, but is not limited to, a DC voltage source 310, a half-bridge inverter circuit 312, a capacitor 314 and a multiple coil structure 320. Half-bridge inverter circuit 312 is controlled by a control circuit (not shown) to provide an AC signal to capacitor 314 and multiple coil structure 320. The generated AC signal can be, but is not limited to, a square wave, a sinusoidal wave, a triangular wave, or a sawtooth wave. Although DC voltage source 310 and half-bridge inverter circuit 312 are shown in FIG. 3, any circuit configured to generate an AC signal is within the scope of the invention. The capacitance value of capacitor 314 and the inductance value of multiple coil structure 320 determine a resonant frequency for transmitter 300, which is preferably in the range of 100 KHz to 250 KHz. The alternating current passing through multiple coil structure 320 generates magnetic flux that can induce a current in a receiver coil (not shown).

Multiple coil structure 320 includes interleaved coils 322, 324 and 326. Each of coils 322, 324, and 326 is shown as having two turns for ease of illustration; coils having any number of turns N are within the scope of the invention. None of coils 322, 324, and 326 is a complete coil, as all of the turns are not formed before the coil is coupled to another coil in the structure 320. Multiple interleaved coil structure 320 is preferably formed from a single continuous wire, but any other technique for forming multiple interleaved coil structure 320, such as coupling together multiple segments of wire or printing conductive material on a printed circuit board, is within the scope of the invention. Coil 322, coil 324, and coil 326 preferably have substantially the same shape, number of turns, and total area. Each of coils 322, 324, and 326 is a flat coil of generally square shape; however, coils of any flat shape such as circular or rectangular are within the scope of the invention. Each of coils 322, 324, and 326 includes a plurality of non-contiguous segments arranged in such a way that the coil will emit magnetic flux in response to an alternating current. Between coil 322 and coil 324 is an interconnect 332 that includes four wires. As shown in FIG. 3, when two of the wires in interconnect 332 carry current from left to right the other two wires in interconnect 332 carry current from right to left. Since the wires in interconnect 332 are arranged close to one another yet do not form a loop, interconnect 332 does not emit magnetic flux. Thus interconnect 332 is not an inadvertent radiator of EMI. Similarly, an interconnect 334 between coil 324 and coil 326 carries current running in opposing directions yet does not emit magnetic flux. Multiple coil structure 320 provides multiple coils that emit magnetic flux while avoiding the creation of parasitic coils to reduce the emission of inadvertent EMI.

Figure 4:
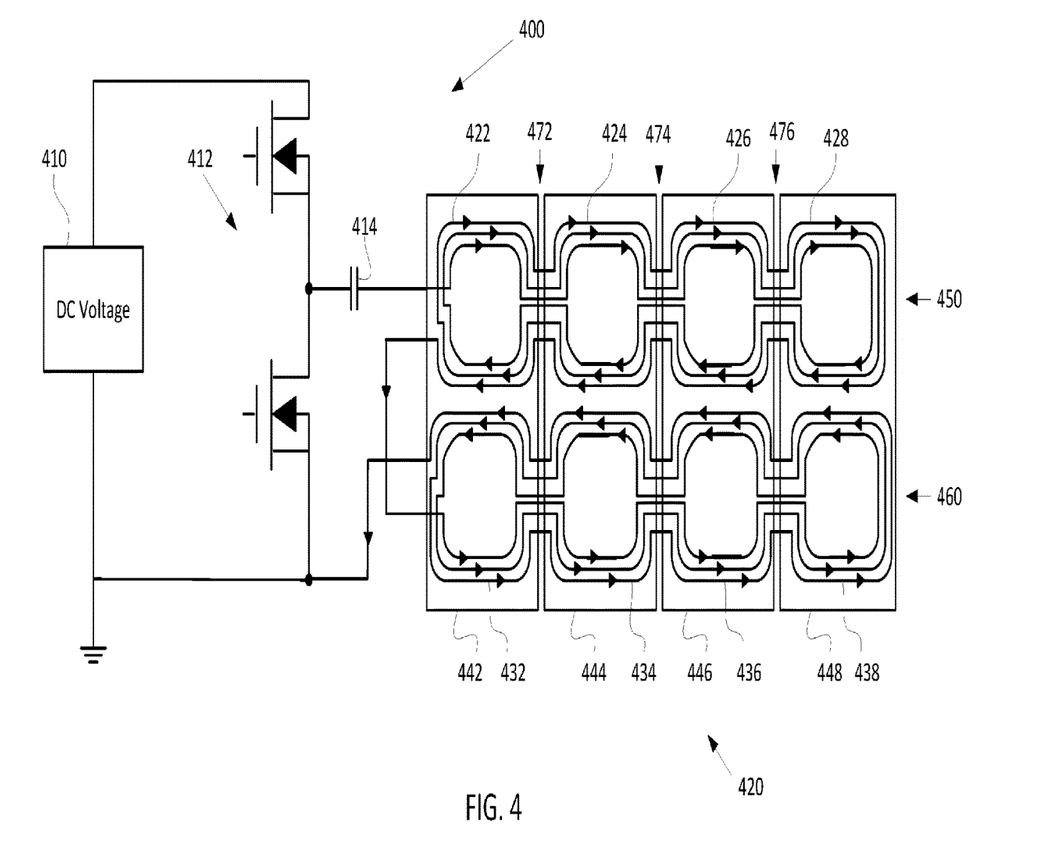
FIG. 4 is a diagram of a wireless power transmitter with a multiple interleaved coil structure, according to one embodiment of the invention.

FIG. 4 is a diagram of a wireless power transmitter 400 with a multiple coil structure, according to another embodiment of the invention. Transmitter 400 includes, but is not limited to, a DC voltage source 410, a half-bridge inverter circuit 412, a capacitor 414 and a multiple coil structure 420. Half-bridge inverter circuit 412 is controlled by a control circuit (not shown) to provide an AC signal to capacitor 414 and multiple coil structure 420. The generated AC signal can be, but is not limited to, a square wave, a sinusoidal wave, a triangular wave, or a sawtooth wave. Although DC voltage source 410 and half-bridge inverter circuit 412 are shown in FIG. 4, any circuit configured to generate an AC signal is within the scope of the invention. The capacitance value of capacitor 414 and the inductance value of multiple coil structure 420 determine a resonant frequency for transmitter 400, which is preferably in the range of 100 KHz to 250 KHz. The alternating current passing through multiple coil structure 420 generates magnetic flux that can induce a current in a receiver coil (not shown).

Multiple coil structure 420 includes two interleaved coil arrays 450 and 460. Interleaved coil array 450 includes coils 422, 424, 426, and 428. Interleaved coil array 460 includes coils 432, 434, 436, and 438. Each of the coils in multiple coil structure 420 is shown having three turns for ease of illustration; coils having any number of turns are within the scope of the invention. None of the coils in coil array 450 and coil array 460 is a complete coil, as all of the turns are not formed before the coil is coupled to another coil in the structure 420. The coils and interconnects of multiple interleaved coil structure 420 are preferably formed from a single continuous wire, but any other technique for forming the coils and interconnects of multiple interleaved coil structure 420, such as coupling together multiple segments of wire or printing conductive material on a printed circuit board, is within the scope of the invention. All of the coils in multiple coil structure 420 preferably have substantially the same shape, number of turns, and total area. Each coil in coil structure 420 is a flat coil of generally square shape; however, coils of any flat shape such as circular or rectangular are within the scope of the invention. Each of coils 422, 424, 426, and 428 includes a plurality of non-contiguous segments arranged in such a way that the coil will emit magnetic flux in response to an alternating current. Between coil 422 and coil 424 is an interconnect 472 that includes six wires. As shown in FIG. 4, when three of the wires in interconnect 472 carry current from left to right the other three wires in interconnect 472 carry current from right to left. Since the wires in interconnect 472 are arranged close to one another yet do not form a loop, interconnect 472 does not emit magnetic flux. Thus interconnect 472 is not an inadvertent radiator of EMI. Similarly, interconnects between other coils in coil structure 420, such as interconnect 474 between coils 424 and 426 and interconnect 476 between coils 426 and 428, carry current running in opposing directions yet do not emit magnetic flux. Multiple coil structure 420 provides multiple coils that emit magnetic flux while avoiding the creation of parasitic coils to reduce the emission of inadvertent EMI.

As shown in FIG. 4, coil array 450 and coil array 460 are coupled together such that when current is flowing in a clockwise direction in coils 422, 424, 426, and 428 the current is flowing in a counter-clockwise direction in coils 432, 434, 436, and 438. The operation and benefits of pairs of coils producing magnetic flux with opposite polarities is further disclosed in co-pending U.S. application Ser. No. 15/802,533, entitled "Wireless Power Transfer Using Multiple Coil Arrays," filed on Mar. 28, 2016, the subject matter of which is incorporated herein by reference. Multiple coil structure 420 further includes magnetic layers 442, 444, 446, and 448, which can be ferrite or any other magnetic material known in the art. Magnetic layer 442 magnetically couples coil 422 and 432 such that the magnetic flux lines generated by coil 422 and coil 432 will couple together to form closed flux lines. Similarly, magnetic layer 444 magnetically couples coil 424 and coil 434, magnetic layer 446 magnetically couples coil 426 and coil 436, and magnetic layer 448 magnetically couples coil 428 and coil 438. Magnetic layers 442 and 444 are separated by an air gap 472, which causes high reluctance between adjacent coils 422 and 424 and adjacent coils 432 and 434. Air gap 474 causes high reluctance between coils 424 and 434 on magnetic layer 444 and coils 426 and 436 on magnetic layer 446.

Air gap 476 causes high reluctance between coils 426 and 436 on magnetic layer 446 and coils 428 and 438 on magnetic layer 448.

Figure 5:
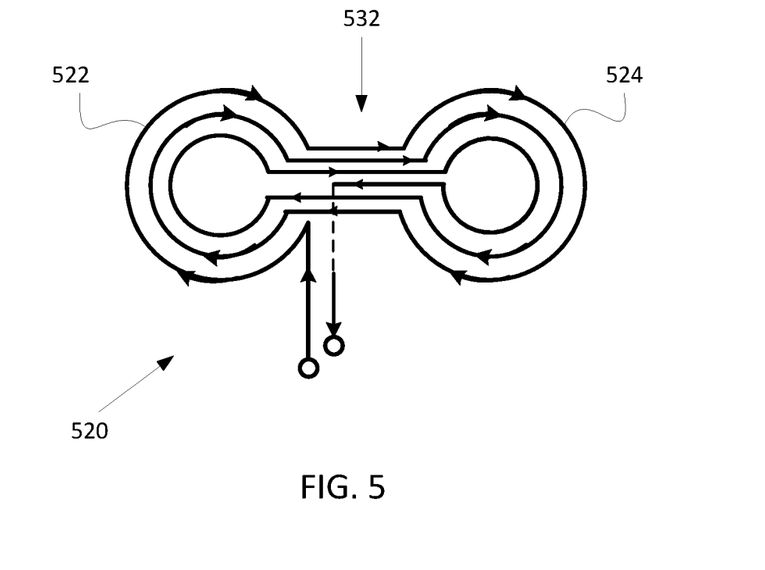
FIG. 5 is a diagram of a multiple interleaved coil structure for wireless power transfer, according to one embodiment of the invention.

FIG. 5 is a diagram of a multiple interleaved coil structure 520 for wireless power transfer, according to another embodiment of the invention. Multiple interleaved coil structure 520 includes two interleaved coils 522 and 524 coupled with an interconnect 532. Multiple interleaved coil structure 520 is configured in such a way that an applied current that flows clockwise in coil 522 will also flow clockwise in coil 524. Each of coils 522 and 524 is shown as having three turns for ease of illustration; coils having any number of turns are within the scope of the invention. Neither coil 522 nor coil 524 is a complete coil, as all of the turns are not formed before the coil is coupled to another coil in structure 520. Multiple interleaved coil structure 520 is preferably formed from a single continuous wire, but any other technique for forming multiple interleaved coil structure 520, such as coupling together multiple segments of wire or printing conductive material on a printed circuit board, is within the scope of the invention. Coil 522 and coil 524 preferably have substantially the same shape, number of turns, and total area. Each of coils 522 and 524 is a flat coil of generally circular shape; however, coils of any flat shape such as square or rectangular are within the scope of the invention. Each of coils 522 and 524 includes a plurality of non-contiguous segments arranged in such a way that the coil will emit magnetic flux in response to an alternating current. As shown in FIG. 5, when three of the wires in interconnect 532 carry current from left to right the other three wires in interconnect 532 carry current from right to left. Since the wires in interconnect 532 are arranged close to one another yet do not form a loop, interconnect 532 will not emit magnetic flux in response to an applied AC current. Thus interconnect 532 will not be an inadvertent radiator of EMI. Multiple interleaved coil structure 520 may be used at a transmitter coil, a receiver coil, or an alignment coil for wireless power transfer.

Figure 6:
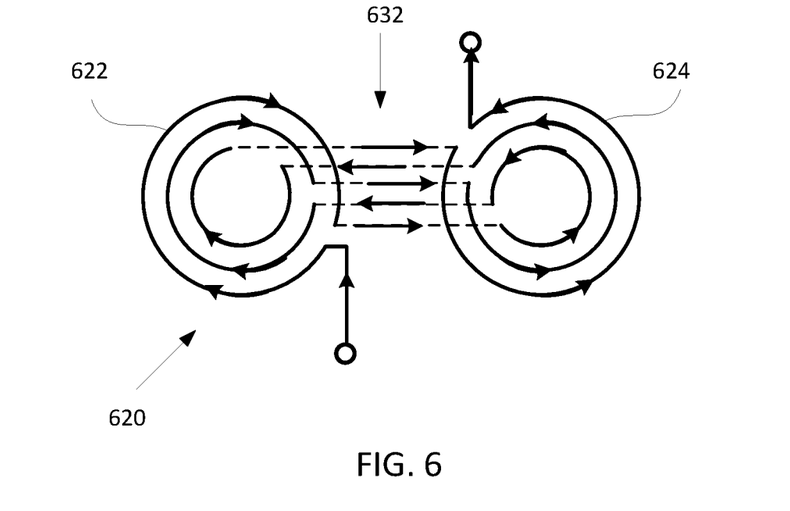
FIG. 6 is a diagram of a multiple interleaved coil structure for wireless power transfer, according to one embodiment of the invention.

FIG. 6 is a diagram of a multiple interleaved coil structure 620 for wireless power transfer, according to another embodiment of the invention. Multiple interleaved coil structure 620 includes two interleaved coils 622 and 624 coupled with an interconnect 632. Multiple interleaved coil structure 620 is configured in such a way that an applied current that flows clockwise in coil 622 will flow counter-clockwise in coil 624. Each of coils 622 and 624 is shown as having three turns for ease of illustration; coils having any number of turns are within the scope of the invention. Neither coil 622 nor coil 624 is a complete coil, as all of the turns are not formed before the coil is coupled to another coil in structure 620. Multiple interleaved coil structure 620 is preferably formed from a single continuous wire, but any other technique for forming multiple interleaved coil structure 620, such as coupling together multiple segments of wire or printing conductive material on a printed circuit board, is within the scope of the invention. Coil 622 and coil 624 preferably have substantially the same shape, number of turns, and total area. Each of coils 622 and 624 is a flat coil of generally circular shape; however, coils of any flat shape such as square or rectangular are within the scope of the invention. Each of coils 622 and 624 includes a plurality of non-contiguous segments arranged in such a way that the coil will emit magnetic flux in response to an alternating current. As shown in FIG. 6, when three of the wires in interconnect 632 carry current from left to right the other two wires in interconnect 632 carry current from right to left. Since the wires in interconnect 632 are arranged close to one another yet do not form a loop, interconnect 632 will not emit magnetic flux in response to an applied AC current. Thus interconnect 632 will not be an inadvertent radiator of EMI. Multiple interleaved coil structure 620 can be used as a transmitter coil, a receiver coil, or an alignment coil for wireless power transfer.

Figure 7:
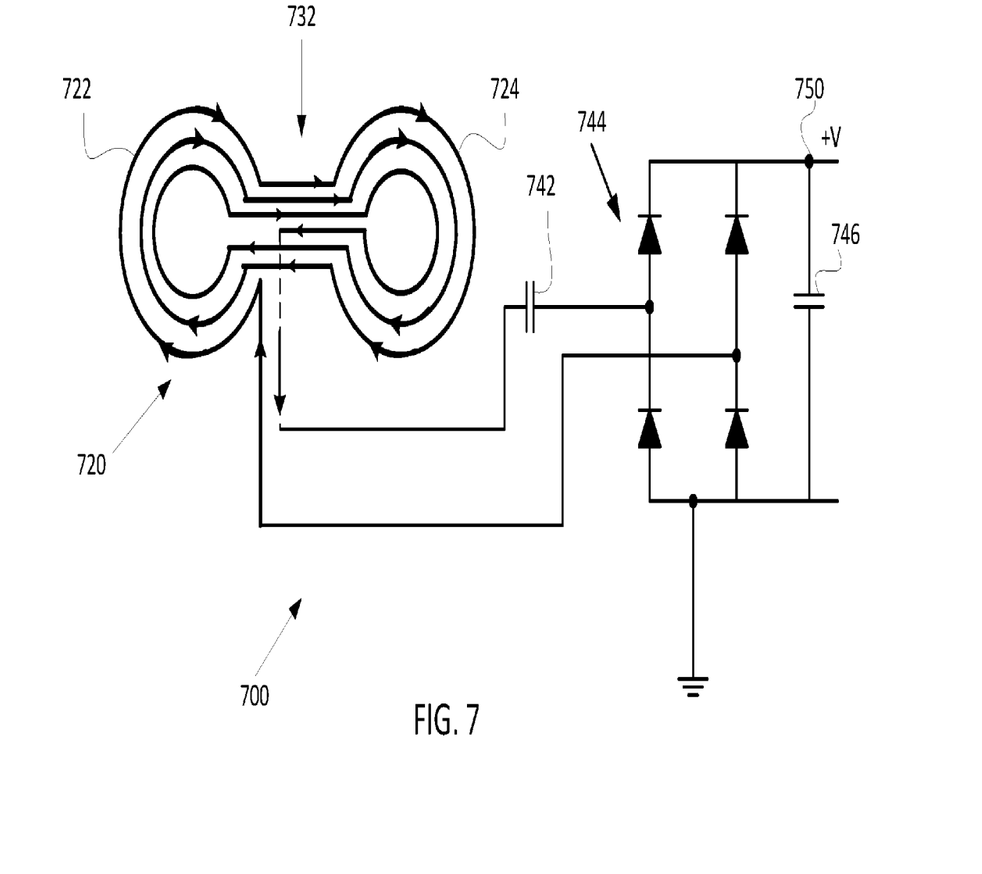
FIG. 7 is a diagram of a wireless power receiver with a multiple interleaved coil structure, according to one embodiment of the invention.

FIG. 7 is a diagram of a wireless power receiver 700 with a multiple coil structure, according to one embodiment of the invention. Receiver 700 includes, but is not limited to, a multiple interleaved coil structure 720, a capacitor 742, a full-bridge rectifier circuit 744, and a capacitor 746. Multiple interleaved coil structure 720 includes a coil 722, a coil 724, and an interconnect 732. The capacitance value of capacitor 742 and the inductance of multiple interleaved coil structure 720 define a resonant frequency for receiver 700. When multiple interleaved coil structure 720 is in close proximity to a magnetic field, magnetic induction will cause an alternating current to flow in multiple interleaved coil structure 720. Full-bridge rectifier circuit 744 and capacitor 746 rectify and filter the induced alternating current to produce a generally direct current voltage at an output voltage rail 750. The voltage at output voltage rail 750 may provide power to an electronic device or a rechargeable battery.

Multiple interleaved coil structure 720 is configured in such a way that an induced current that flows clockwise in coil 722 will also flow clockwise in coil 724. Each of coils 722 and 724 is shown as having three turns for ease of illustration; coils having any number of turns are within the scope of the invention. Neither coil 722 nor coil 724 is a complete coil, as all of the turns are not formed before the coil is coupled to another coil in structure 720. Multiple interleaved coil structure 720 is preferably formed from a single continuous wire, but any other technique for forming multiple interleaved coil structure 720, such as coupling together multiple segments of wire or printing conductive material on a printed circuit board, is within the scope of the invention. Coil 722 and coil 724 preferably have substantially the same shape, number of turns, and total area. Each of coils 722 and 724 is a flat coil of generally circular shape; however, coils of any flat shape such as square or rectangular are within the scope of the invention. Each of coils 722 and 724 includes a plurality of non-contiguous segments arranged in such a way that an alternating current can be induced in the coil by magnetic flux. As shown in FIG. 7, when three of the wires in interconnect 732 carry current from left to right the other three wires in interconnect 732 carry current from right to left. Since the wires in interconnect 732 are arranged close to one another yet do not form a loop, interconnect 732 will not emit magnetic flux in response to an induced AC current. Thus interconnect 732 will not be an inadvertent radiator of EMI.

Figure 8:
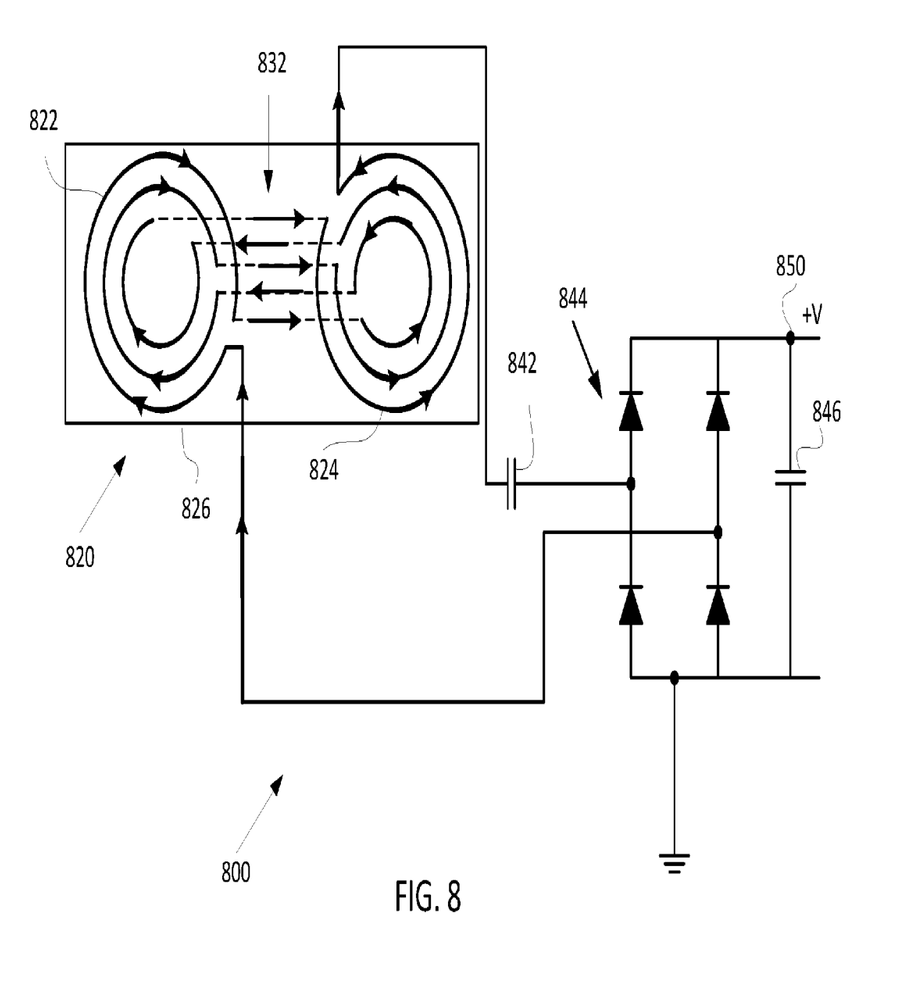
FIG. 8 is a diagram of a wireless power receiver with a multiple interleaved coil structure, according to one embodiment of the invention.

FIG. 8 is a diagram of a wireless power receiver 800 with a multiple coil structure, according to one embodiment of the invention. Receiver 800 includes, but is not limited to, a multiple interleaved coil structure 820, a capacitor 842, a full-bridge rectifier circuit 844, and a capacitor 846. Multiple interleaved coil structure 820 includes a coil 822, a coil 824, an interconnect 832, and magnetic layer 826. The capacitance value of capacitor 842 and the inductance of multiple interleaved coil structure 820 define a resonant frequency for receiver 800. When multiple interleaved coil structure 820 is in close proximity to a magnetic field, magnetic induction will cause an alternating current to flow in multiple interleaved coil structure 820. Full-bridge rectifier circuit 844 and capacitor 846 rectify and filter the induced alternating current to produce a generally direct current voltage at an output voltage rail 850. The voltage at output voltage rail 850 may provide power to an electronic device or a rechargeable battery.

Multiple interleaved coil structure 820 is configured in such a way that an induced current that flows clockwise in coil 822 will flow counter-clockwise in coil 824. Each of coils 822 and 824 is shown as having three turns for ease of illustration; coils having any number of turns are within the scope of the invention. Neither coil 822 nor coil 824 is a complete coil, as all of the turns are not formed before the coil is coupled to another coil in structure 820. The coils and interconnect of multiple interleaved coil structure 820 are preferably formed from a single continuous wire, but any other technique for forming the coils and interconnect of multiple interleaved coil structure 820, such as coupling together multiple segments of wire or printing conductive material on a printed circuit board, is within the scope of the invention. Coil 822 and coil 824 preferably have substantially the same shape, number of turns, and total area. Each of coils 822 and 824 is a flat coil of generally circular shape; however, coils of any flat shape such as square or rectangular are within the scope of the invention. Each of coils 822 and 824 includes a plurality of non-contiguous segments arranged in such a way that an alternating current can be induced in the coil by magnetic flux. Magnetic layer 826, which can be ferrite or any other magnetic material known in the art, magnetically couples coil 822 and coil 824. As shown in FIG. 8, when three of the wires in interconnect 832 carry current from left to right the other two wires in interconnect 832 carry current from right to left. Since the wires in interconnect 832 are arranged close to one another yet do not form a loop, interconnect 832 will not emit magnetic flux in response to an applied AC current. Thus interconnect 832 will not be an inadvertent radiator of EMI.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power transfer system comprising:
   a coil structure comprising a plurality of interleaved coil arrays comprising a first interleaved coil array and a second interleaved coil array, each of the interleaved coil arrays comprising:
      a plurality of coil wire segments, wherein each coil wire segment comprises a first end and a second end, and
      a plurality of interconnection wire segments disposed between adjacent coil wire segments in the plurality of interleaved coil arrays, wherein
      each interconnection wire segment is connected between the second end of a coil wire segment in a first coil segment of the adjacent coil wire segments and the first end of a coil wire segment in a second coil segment of the adjacent coil wire segments, and
      the plurality of interconnection wire segments are parallel to a same axis; and
   a resonant capacitor coupled to the coil structure, wherein the resonant frequency of the wireless power transfer system is configured based on a capacitance of the resonant capacitor and an inductance of the coil structure.

2. The wireless power transfer system of claim 1, wherein the coil structure is coupled to a circuit configured to provide an alternating current to the plurality of coil wire segments to cause each coil wire segment to emit magnetic flux.

3. The wireless power transfer system of claim 1, wherein the coil structure is coupled to a circuit configured to rectify an alternating current induced in at least one of the plurality of wire segments by magnetic flux.

4. The wireless power transfer system of claim 1, wherein the plurality of interleaved coil arrays are electrically connected with an alternating current configured to flow in the coil wire segments of the first interleaved coil array in a clockwise direction and the alternating current configured to flow in the coil wire segments of the second interleaved coil array in a counter-clockwise direction.

5. A wireless power transfer system comprising:
a plurality of coil structures each comprising a plurality of interleaved coil arrays comprising a first interleaved coil array and a second interleaved coil array, each of the interleaved coil arrays comprising:
   a plurality of coil wire segments, wherein each coil wire segment comprises a first end and a second end, and
   a plurality of interconnection wire segments disposed between adjacent coil wire segments in the plurality of interleaved coil arrays, wherein
   each interconnection wire segment is connected between the second end of a coil wire segment in a first coil segment of the adjacent coil wire segments and the first end of a coil wire segment in a second coil segment of the adjacent coil wire segments, and
   the plurality of coil structures are coupled together in series; and
a resonant capacitor coupled to the plurality of coil structures, wherein the resonant frequency of the wireless power transfer system is configured based on a capacitance of the resonant capacitor and an inductance of the plurality of coil structures.

6. The wireless power transfer system of claim 5, wherein the plurality of coil structures is coupled to a circuit configured to provide an alternating current to the plurality of coil structures to cause each of the plurality of interleaved coil arrays to emit magnetic flux.

7. The wireless power transfer system of claim 5, wherein the plurality of coil structures is coupled to a circuit configured to rectify an alternating current induced in at least one of the plurality of coil wire segments by magnetic flux.

8. The wireless power transfer system of claim 5, wherein the plurality of interleaved coil arrays are electrically connected with an alternating current configured to flow in the coil wire segments of the first interleaved coil array in a clockwise direction and the alternating current configured to flow in the coil wire segments of the second interleaved coil array in a counter-clockwise direction.

9. The wireless power transfer system of claim 1, wherein the plurality of coil wire segments and the plurality of interconnection wire segments are formed of a continuous wire.

10. The wireless power transfer system of claim 9 further comprising a wireless power transmitter, wherein the wireless power transmitter comprises the coil structure and the resonant capacitor.

11. The wireless power transfer system of claim 10, wherein the coil structure is configured to generate a magnetic flux and induce a current in a wireless power receiver operating at the resonant frequency of the wireless power transfer system.

12. The wireless power transfer system of claim 1 further comprising a wireless power receiver, wherein the wireless power receiver comprises the coil structure and the resonant capacitor.

13. The wireless power transfer system of claim 12, wherein the wireless power receiver is configured to wirelessly couple to a wireless power transmitter at the resonant frequency of the wireless power transfer system.

14. The wireless power transfer system of claim 1, wherein the resonant frequency is configured to be 250 kHz or less.

15. The wireless power transfer system of claim 5, wherein the plurality of coil wire segments and the plurality of interconnection wire segments are formed of a continuous wire.

16. The wireless power transfer system of claim 5, further comprising a wireless power transmitter, wherein the wireless power transmitter comprises the plurality of coil structures and the resonant capacitor.

17. The wireless power transfer system of claim 16, wherein the plurality of coil structures are configured to generate a magnetic flux and induce a current in a wireless power receiver operating at the resonant frequency of the of the wireless power transfer system.

18. The wireless power transfer system of claim 5, further comprising a wireless power receiver, wherein the wireless power receiver comprises the plurality of coil structures and the resonant capacitor.

19. The wireless power transfer system of claim 18, wherein the wireless power receiver is configured to wirelessly couple to a wireless power transmitter at the resonant frequency of the wireless power transfer system.

20. The wireless power transfer system of claim 19, wherein the resonant frequency is configured to be 250 kHz or less.

21. The wireless power transfer system of claim 1, wherein the plurality of coil wire segments are arc shaped.

22. The wireless power transfer system of claim 1, wherein the plurality of interconnection wire segments are aligned with the same axis.

23. The wireless power transfer system of claim 1, wherein the coil structure further comprises at least one magnetic layer configured to magnetically couple a like numbered coil in each of the plurality of interleaved coil arrays.

24. The wireless power transfer system of claim 23, wherein the magnetic layer comprises a ferrite material.

25. The wireless power transfer system of claim 5, wherein the plurality of coil wire segments are arc shaped.

26. The wireless power transfer system of claim 5, wherein the plurality of interconnection wire segments are aligned with the same axis.

27. The wireless power transfer system of claim 5, wherein the coil structure further comprises at least one magnetic layer configured to magnetically couple a like numbered coil wire segment in each of the plurality of interleaved coil arrays.

28. The wireless power transfer system of claim 27, wherein the magnetic layer comprises a ferrite material.

* * * * *